July 7, 1964

G. P. MARCY 3,140,043

INLET STRUCTURE FOR GAS COMPRESSORS

Filed Jan. 16, 1963

GERALD P. MARCY
INVENTOR.

BY *Daniel A. Bobr*
*Atty*

3,140,043
INLET STRUCTURE FOR GAS COMPRESSORS
Gerald P. Marcy, Longmeadow, Mass., assignor to Worthington Corporation, Harrison, N.J., a corporation of Delaware
Filed Jan. 16, 1963, Ser. No. 251,953
8 Claims. (Cl. 230—207)

This invention relates generally to gas compressors. More particularly the invention relates to gas compressors having rotary sliding vanes. Heretofore rotary sliding vane gas compressors have permitted the incoming gas to be mixed and heated by the spray of hot oil and carry-over gas carried through and coming out of the undercut adjacent the suction port. Because this oil is considerably warmer and of much greater density than the incoming air, a very small amount of oil will raise the temperature of the incoming air sufficiently to adversely affect the compressor capacity and power consumption.

An object of this invention is to provide an improved inlet structure for gas compressors which overcomes the prior art difficulties; which increases capacity while decreasing power consumption; which prevents or at least lessens the temperature rise in the incoming gas caused by its mixture with the spray of hot oil and carry-over gas; which separates the incoming gas from the spray of hot oil and carry-over gas; which is simple, reliable and efficient in design.

Other objects and advantages will be apparent from the following description of the several embodiments of the invention and the novel features will be particularly pointed out hereinafter in the claims.

Figure 1:
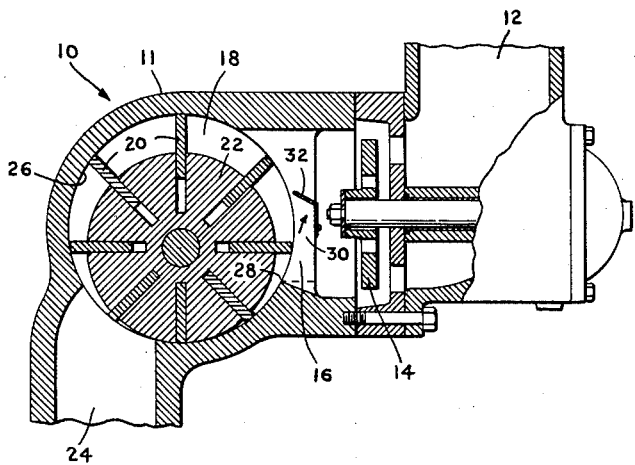
FIGURE 1 is a side elevation, partly in section, of the improved inlet structure of the invention.
Figure 2:
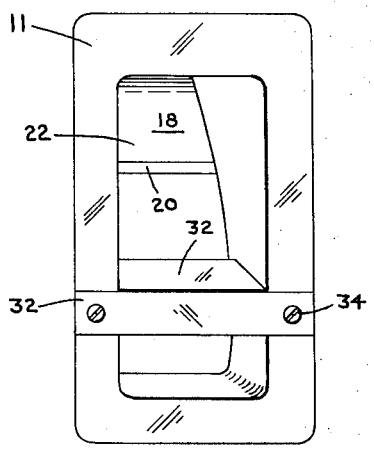
FIGURE 2 is a perspective view of one embodiment of the invention taken looking into the chamber.

In the embodiment of the invention illustrated in FIGURES 1 and 2, FIGURE 1 shows a typical gas compressor 10 having a casing 11 and rotary sliding vanes therein and may be any type of unit commonly used and readily available on the open market. Since such compressors are well known in the art, it need only be referred to briefly as follows: gas enters the inlet 12 and the amount of gas may be controlled by a suitable inlet valve 14 positioned adjacent the inlet or suction port 16, the incoming gas is drawn into chamber 18 and entrapped between adjacent vanes 20 where due to the action of the eccentric rotor 22 it is compressed prior to being discharged through the outlet 24.

Compressors of the type described use a fluid as a sealing and lubricating agent such as oil to prevent the entrapped gas from passing between the chamber wall 26 and the tip of the vane 20. However, this sealing oil becomes hot and a certain amount of it will be carried in the undercut of the suction manifold (not shown) and on passing the lip 28 will spray as indicated by arrow 30 into inlet or suction port 16, thus mixing with and heating the incoming gas, unless otherwise prevented.

In order to gain the benefits of the sealing and lubricating oil and yet largely prevent the adverse effects, i.e., the spray 30 of hot oil causing the incoming air to rise in temperature, the improved inlet structure uses a baffle 32 so located in the inlet port 16 as to collect the oil spray and cause it to coalesce or form droplets which will be drained from the suction port 16 and returned to the oil reservoir (not shown).

Consequently the spray 30 of hot oil is removed from intimate contact with the incoming air which can now enter the chamber 18 at a lower temperature so that a larger mass of air will be compressed per revolution. As a result the compressor 10 may have an increased capacity of about 5% and at the same time have about a 3% decrease in power consumption per 100 c.f.m.

To facilitate the drainage of the coalesced spray 30 of hot oil the baffle 32 is positioned at a slight angle so that the collected oil droplets will flow away from the chamber 18.

Baffle 32 may be as shown in FIGURE 2 a separate component suitably connected to the casing 11 as by threaded members 34. The use of baffles 32 would enable existing compressors to be readily modified.

Figure 3:
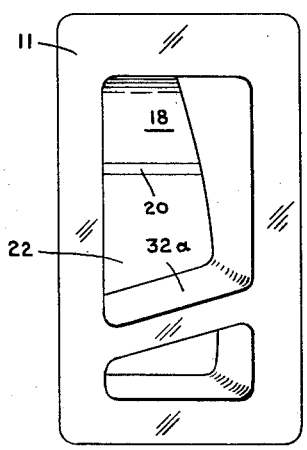
FIGURE 3 is a perspective view of another embodiment of the invention taken looking into the chamber.

In the embodiment of the invention shown in FIGURE 3 casing 11 has an integrally formed baffle 32a which is the same as baffle 32 except that it is formed at a slight angle with the horizontal so that the coalesced oil will drain not only away from chamber 18 but also to one side of baffle 32a.

It will be understood that various changes in the details, materials, and arrangements of parts which have been herein described and illustrated in order to explain the nature of the invention may be made by those skilled in the art within the principle and scope of the invention as expressed in the claims.

What is claimed is:
1. A gas compressor comprising:
    (a) a casing having an inlet and an outlet therein,
    (b) said casing having chamber means formed therein,
    (c) a rotor disposed in said chamber means and connected to a source of power for rotation,
    (d) a plurality of vanes slidably disposed in spaced relationship to each other in said rotor and on rotation of said rotor adapted to bear against said casing,
    (e) oil means to lubricate said compressor and to seal said vanes and said casing to prevent the entrapped gas from leaking therebetween in said chamber means,
    (f) baffle means disposed across said inlet to prevent said oil means in said chamber means from mixing with and raising the temperature of the incoming gas.
2. The combination claimed in claim 1 wherein said baffle means is disposed across said inlet in a substantially longitudinal relationship with said rotor.
3. The combination claimed in claim 1 wherein said baffle means is disposed in said inlet means to catch and coalesce the spray of said oil means on said vane crossing said inlet means whereby said oil means cannot mix with the incoming gas.
4. The combination claimed in claim 3 wherein said baffle means is disposed transversely to the spray of said oil means to guide the incoming gas in said inlet in the direction away from the spray of said oil means.
5. The combination claimed in claim 4 wherein said baffle means is disposed across said inlet at a slight angle to the direction of said incoming gas flow to guide the coalesced spray of said oil means away from the inlet for the incoming gas into said chamber means.
6. The combination claimed in claim 5 wherein said baffle means is formed integral with said casing.
7. The combination claimed in claim 5 wherein:
    (a) said baffle means is formed individually apart from said casing and
    (b) means connecting said baffle means to said casing in opposite position to each other relative to said baffle means.
8. An intake structure for a gas compressor having a casing with inlets and outlets, said casing having a chamber means formed therein, a rotor disposed in said cham- ber means and connected to a source of power for rotation thereof, a plurality of vanes slidably disposed in spaced relationship to each other in said rotor and on rotation of said rotor adapted to bear against said casing, oil means to lubricate said compressor and to seal said vanes and said casing to prevent the entrapped gas in said compressor from leaking therebetween in said chamber means, and said intake structure comprising baffle means disposed across said inlet to prevent said oil means in said chamber means from mixing with and raising the temperature of the incoming air.

References Cited in the file of this patent

UNITED STATES PATENTS

| | | |
|---|---|---|
| 2,829,925 | Monteil | Apr. 8, 1958 |
| 2,845,048 | Fraser | July 29, 1958 |
| 2,894,677 | Nash | July 14, 1959 |
| 2,906,448 | Lorenz | Sept. 29, 1959 |
| 2,961,151 | Fobian | Nov. 22, 1960 |

FOREIGN PATENTS

| | | |
|---|---|---|
| 277,623 | Germany | Jan. 3, 1912 |
| 131,781 | Great Britain | Oct. 18, 1918 |